US007035909B1

(12) United States Patent
Lee et al.

(10) Patent No.: US 7,035,909 B1
(45) Date of Patent: Apr. 25, 2006

(54) METHOD FOR EXECUTING AN OBJECT IN A WIRELESS INTERNET ACCESS TERMINAL

(75) Inventors: Hwa Kyung Lee, Seoul (KR); Ki Young Kim, Seoul (KR); Jin Hee Yoo, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 467 days.

(21) Appl. No.: 09/453,918

(22) Filed: Apr. 27, 2000

(30) Foreign Application Priority Data

Sep. 8, 1999 (KR) ................................. 1999-38210

(51) Int. Cl.
*G06F 15/16* (2006.01)
*G06F 17/00* (2006.01)

(52) U.S. Cl. ........................ 709/217; 709/219; 715/767
(58) Field of Classification Search ................ 709/219, 709/206, 220; 455/566, 575.2, 572, 569, 455/550, 564; 345/684, 719; 370/338; 235/380; 705/14; 340/573.1
See application file for complete search history.

(56) References Cited

U.S. PATENT DOCUMENTS

| 5,848,397 | A | * | 12/1998 | Marsh et al. .................. 705/14 |
| 5,959,623 | A | * | 9/1999 | van Hoff et al. ............. 345/719 |
| 5,963,875 | A | * | 10/1999 | Go .............................. 455/564 |
| 5,966,671 | A | * | 10/1999 | Mitchell et al. ............. 455/575 |
| 5,969,318 | A | * | 10/1999 | Mackenthun ................ 235/380 |
| 6,121,881 | A | * | 9/2000 | Bieback et al. .......... 340/573.1 |
| 6,125,287 | A | * | 9/2000 | Cushman et al. ........... 455/566 |
| 6,128,012 | A | * | 10/2000 | Seidensticker et al. ..... 345/685 |
| 6,243,596 | B1 | * | 6/2001 | Kikinis ........................ 455/572 |
| 6,272,361 | B1 | * | 8/2001 | Courtis et al. .............. 455/569 |
| 6,285,985 | B1 | * | 9/2001 | Horstmann .................. 705/14 |
| 6,297,795 | B1 | * | 10/2001 | Kato et al. ................... 345/684 |
| 6,321,257 | B1 | * | 11/2001 | Kotola et al. ............... 709/219 |
| 6,381,474 | B1 | * | 4/2002 | Kraft ........................... 455/566 |
| 6,421,708 | B1 | * | 7/2002 | Bettis .......................... 709/206 |
| 6,470,197 | B1 | * | 10/2002 | Tuoriniemi et al. ...... 455/575.2 |
| 6,487,424 | B1 | * | 11/2002 | Kraft et al. ................. 455/566 |
| 6,487,602 | B1 | * | 11/2002 | Thakker ..................... 709/230 |
| 6,519,241 | B1 | * | 2/2003 | Theimer ..................... 370/338 |

(Continued)

OTHER PUBLICATIONS

Person et al, Using Windows 95, 1995, Que Corporation, Special Edition, p. 147-149.*

*Primary Examiner*—John Follansbee
*Assistant Examiner*—Kenny Lin
(74) *Attorney, Agent, or Firm*—Sughrue Mion, PLLC

(57) ABSTRACT

The present invention relates to a method for executing an object in a wireless internet access terminal. The present invention includes steps of interpreting data inputted through the internet and displaying the inputted data; focusing any one of plural objects displayed on a screen and each linked to predetermined resource access location information; and selecting and executing any one of various execution items of the focused object according to an input state of a single button, so that it has an effect in that a user uses internet services conveniently through a wireless terminal since a user determines an execution item of an object with ease without pressing buttons several times with inconvenience by providing different execution items of an object according to input states of a single button in case that there exist plural execution items of one object.

13 Claims, 7 Drawing Sheets

U.S. PATENT DOCUMENTS

| | | | |
|---|---|---|---|
| 6,522,893 B1 * | 2/2003 | Han et al. | 455/550 |
| 6,560,640 B1 * | 5/2003 | Smethers | 709/219 |
| 6,670,968 B1 * | 12/2003 | Schilit et al. | 715/760 |
| 6,865,404 B1 * | 3/2005 | Tikkala et al. | 455/566 |

* cited by examiner

FIG.2

(a)
```
1. SAMSUNG ELECTRONICS
2. JUNGANG ILBO
3. KBS
4. MBC
```

(b)
```
1. SAMSUNG ELECTRONICS
2. JUNGANG ILBO
3. KBS
4. MBC
```

(c)
```
1. SAMSUNG ELECTRONICS
2. JUNGANG ILBO
3. KBS
4. MBC
```

(d)
```
1. GET
2. INFORMATION VIEW
3. BOOKMARK
```

(e)
```
1. GET
2. INFORMATION VIEW
3. BOOKMARK
```

(f)
```
1. SAMSUNG ELECTRONICS
2. INFORMATION VIEW
3. BOOKMARK
```

(g)
```
samsung web page
1. PRODUCT INTRODUCTION
2. COMMENTS FROM
   CUSTOMERS
3. SAMSUNG INTRODUCTION
```

FIG.5

(a)
```
1. SAMSUNG ELECTRONICS
2. JUNGANG ILBO
3. KBS
4. MBC
```

(b)
```
1. SAMSUNG ELECTRONICS
2. JUNGANG ILBO
3. KBS
4. MBC
```

(c)
```
1. SAMSUNG ELECTRONICS
2. JUNGANG ILBO
3. KBS
4. MBC
```

(d)
```
    samsung web page
1. PRODUCT INTRODUCTION
2. COMMENTS FROM
   CUSTOMERS
3. SAMSUNG INTRODUCTION
```

(e)
```
1. SAMSUNG ELECTRONICS
http://www>samsung.co.kr
3. KBS
4. MBC
```

(f)
```
1. SAMSUNG ELECTRONICS
   EXECUTING BOOKMARK
3. KBS
4. MBC
```

FIG.7

(a)
1. SAMSUNG ELECTRONICS
2. JUNGANG ILBO
3. KBS
4. MBC (b)
1. SAMSUNG ELECTRONICS
2. JUNGANG ILBO
3. KBS
4. MBC (c)
1. SAMSUNG ELECTRONICS
2. JUNGANG ILBO
3. KBS
4. MBC (d)
samsung web page
1. PRODUCT INTRODUCTION
2. COMMENTS FROM CUSTOMERS
3. SAMSUNG INTRODUCTION (e)
1. SAMSUNG ELECTRONICS
  1. GET
2. JUNGANG ILBO
3. KBS
4. MBC (f)
1. SAMSUNG ELECTRONICS
  2. INFORMATION VIEW
2. JUNGANG ILBO
3. KBS
4. MBC (g)
1. SAMSUNG ELECTRONICS
  3. BOOKMARK
2. JUNGANG ILBO
3. KBS
4. MBC (h)
1. SAMSUNG ELECTRONICS
  4. CANCEL
2. JUNGANG ILBO
3. KBS
4. MBC (i)
1. SAMSUNG ELECTRONICS
http://www>samsung.co.kr
3. KBS
4. MBC

METHOD FOR EXECUTING AN OBJECT IN A WIRELESS INTERNET ACCESS TERMINAL

CROSS-REFERENCE TO RELATED APPLICATIONS

Not Applicable

STATEMENT REGARDING FEDERALLY SPONSORED RESEARCH

Not Applicable

REFERENCE TO A MICROFICHE APPENDIX

Not Applicable

BACKGROUND OF THE INVENTION

1. Description of Prior Art

The internet, started for special purposes such as military communications and the like since 1960s, provides necessary information for all fields such as banking, education, industry, and the like in recent years and becomes a communication means interconnecting all the fields.

At present, enormous researches and developments are progressing to enhance a data transfer speed so that much faster and more diverse services are provided through the internet.

Devices and methods for acquiring information by hooking up the internet anytime and anywhere are more required, so world-wide mobile phone service companies and terminal companies are competitively commercializing a hypertext transfer protocol (HTTP) technology capable of hooking up the internet by using a web browser in a mobile phone.

Accordingly, a subscriber can use electronic mails as well as receive information such as news, stock market prices, weather, sports, and so on by using various wireless terminals such as hand-held phone.

In general, a server and a client are needed for internet web services, the client requests hypertext markup language (HTML) documents to the server through the HTTP protocol, the server transmits the requested documents to the client, and the client displays the contents of the requested documents on a screen through a built-in browser.

The HTML is a language based on text which uses many tags for making a document which will be displayed through a browser.

FIG. 1 is a view for showing one example of a general HTML code for making a hyperlinked text. A HTML code shown in FIG. 1 is an example for hyperlinking a text. In order to make a hyperlink of a text, a text or an image is embraced with anchor tags and a uniform resource locator (URL) of an object is included in a start tag by using an anchor attribute.

Accordingly, as a uniform resource locator (URL) of an object is described in the anchor tags and a user clicks a text or an image hyperlinked to the URL, the user is moved to the URL described in the anchor attribute.

Here, the URL defines a source of information and an information transfer method (protocol), and there are http, ftp, gopher, news, mail, tel, and so on as standard protocols and there are various sources of information.

For example, as shown in FIG. 1, in case that an anchor attribute is "http://www.samsung.co.kr" and a user clicks the hyperlink, the user is moved to a homepage of the domain name "samsung" by the http protocol.

In general, a wireless internet access terminal having a small sized screen is provided with listed menu items and plural buttons for two or more executions regarding a focused object on the screen.

FIG. 2 is a view for explaining steps for executing an object in a general wireless internet access terminal. As shown in FIG. 2, as a user presses a menu button for an internet service, a web browser detects the pressed button, changes modes from a general phone mode to an internet service mode, and then navigates and displays web pages provided by an internet service provider.

As shown in FIG. 2(A), plural objects are displayed on a screen, each of the plural objects is linked to uniform resource locator information and has plural execution items.

Therefore, if a user uses arrow buttons, gives a focus on one object, for example "samsung electronics" as shown in FIG. 2(B), and then presses a menu button, a web browser detects the pressed menu button, reverses a background color the object "samsung elelctronics" as shown in FIG. 2(C), while displaying a list of plural execution items of the focused object "samsung electronics", as shown in FIG. 2(D), on the screen.

At this time, if a user uses arrow buttons, gives a focus on one execution item, for example "get", as shown in FIG. 2(E), and then presses an execution button, a web browser detects the pressed execution button, reverses a background color of the execution item, as shown in FIG. 2(F), and moves to "samsung web page", so that the user can view a screen as shown in FIG. 2(G).

The conventional wireless internet access terminal as mentioned above has at least two different buttons, a menu button and an execution button, to execute one object, in addition to direction buttons necessary to move among menus, so that there exists a problem in that a user uses buttons several times for movement with inconvenience.

Further, there exists another problem, in the conventional wireless internet access terminal as mentioned above, in that execution items for display on a screen are too limited in listing them in case that plural execution items of one object are present.

2. Field of the Invention

The present invention relates to a method for executing an object, which is displayed on a web browser built in a wireless internet access terminal, linked to resource access location information, and more particularly to a method for executing an object in a wireless internet access terminal which is capable of taking a different execution for the object according to a user's selection in case that plural execution items are available for one object.

SUMMARY OF THE INVENTION

It is an object of the present invention, to solve the above problems, to provide a method for executing an object in a wireless internet access terminal which is capable of taking a different execution of the object according to a user's input from a button in case that plural execution items are available for one object.

It is an object of the present invention, to solve the above problems, to provide a method for executing an object in a wireless internet access terminal which, in case that plural execution items exist for one object, displays the execution items sequentially one by one and executes an execution item displayed on the present screen which is selected by a user.

In order to achieve the above objects, a method according to the present invention comprises steps of interpreting data inputted through the internet and displaying the inputted data; focusing any one of plural objects displayed on a screen and each linked to predetermined resource access location information; and selecting and executing any one of various execution items of the focused object according to an input state of a single button.

Accordingly, since different execution items may be taken according to an input from a single button in case that there exist plural execution items of one object and a user determines an execution item of an object simply, a user can use internet service with ease through an wireless terminal without pressing buttons several times with inconvenience.

In order to achieve the above object, another method according to the present invention comprises steps of interpreting data inputted through the internet and displaying the inputted data on a screen; focusing any one of plural objects displayed on the screen and each linked to predetermined resource access location (URL) information; and displaying plural execution items sequentially one by one by displaying one of the plural execution items of the focused object on one screen and executing an execution item displayed on the present screen by an inputs from the button.

Accordingly, since a user can display execution items sequentially one by one on the screen, execute an execution item on the present screen by a user's selection, and determine an execution item of an object simply in case that there exist plural execution items of one object, a user can use internet services with ease through an wireless terminal without pressing buttons several times with inconvenience.

BRIEF DESCRIPTION OF THE DRAWINGS

The above object and other advantages of the present invention will become more apparent by describing in detail a preferred embodiment thereof with reference to the attached drawings, in which:

FIG. 2 is a view for explaining steps for executing an object in a general wireless internet access terminal;

FIG. 5 is a view for explaining respective steps shown in FIG. 4;

FIG. 7 is a view for explaining respective steps shown in FIG. 6.

DETAILED DESCRIPTION OF THE PREFERRED EMBODIMENTS

Hereinafter, first and second embodiments of the present invention will be described in detail with reference to the attached drawings.

Figure 3:
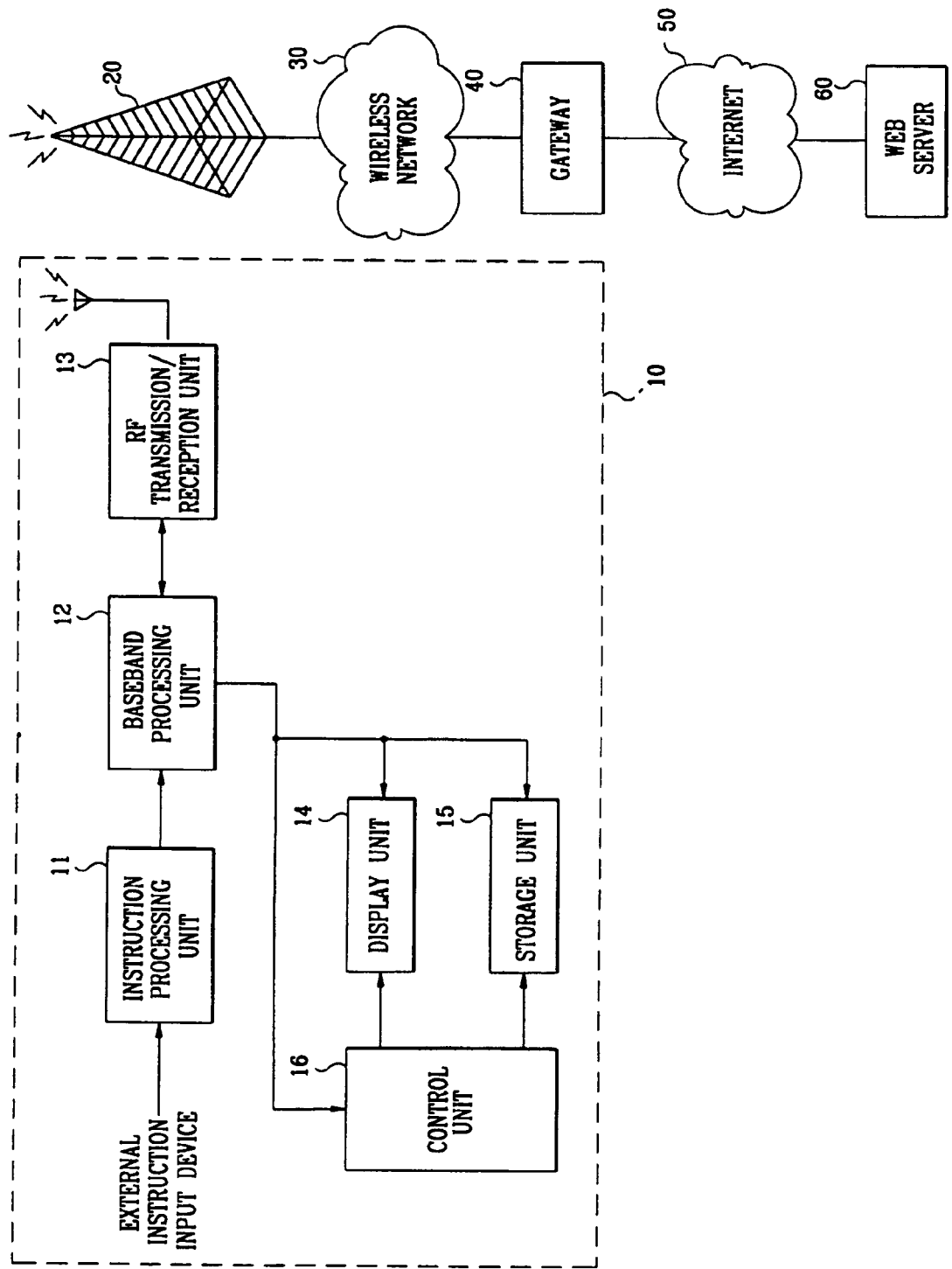
FIG. 3 is a block diagram for schematically explaining a structure of a conventional wireless internet access terminal.

FIG. 3 is a block diagram for schematically explaining a structure of a conventional wireless internet access terminal. As shown in FIG. 3, a wireless internet access terminal 10 consists of an instruction processing unit 11, a baseband processing unit 12, an RF transmission/reception unit 13, a display unit 14, a storage unit 15, and a control unit 16.

Accordingly, a user inputs an instruction through an external instruction input device such as a keypad or a touch screen, the instruction is inputted to the instruction processing unit 11.

The instruction inputted to the instruction processing unit 11 is converted into another instruction which is used in the internet domain 50 and then converted into a data format suitable for a protocol between a wireless network 30 and a gateway 40, to be outputted to the baseband processing unit 12.

The converted instruction undergoes a channel encoding process, an interleaving process, and so on in the baseband processing unit 12, forms frames by transmission unit to be outputted to the RF transmission/reception unit 13.

The frame form of data is converted into an RF signal in the RF transmission/reception unit 13 through a band expansion or a modulation which can be transmitted to a wireless channel, to thereby be transmitted to a base station.

An inputted signal from the base station 20 is converted into a HDML protocol for internet services in the wireless network 30 to be outputted to the gateway 40.

The gateway 40 which inputs the protocol converts a user-inputted instruction into a TCP/IP format which is available in the internet and generates an internet protocol address available in the internet by using an identification number of the wireless terminal 10, to thereby hook up the internet.

Accordingly, the internet domain 50 is hooked up to a web server by a HTTP protocol which supports web services.

Information transmission from the internet 50 to the wireless terminal 10 is accomplished in a similar manner as above. Firstly, in the internet domain 50, information is acquired from the web server 60 and transmitted to the gateway 40.

The gateway 40 outputs information inputted from the internet domain 50 to the wireless network 30 at the identification number of the wireless terminal 10 by using the HDML protocol.

The wireless network 30 transmits the inputted information in the same manner as stated above to the wireless terminal 10 through the base station 20.

The RF transmission/reception unit 13, which receives internet information according to the user-inputted instruction, demodulates the received RF signal to be recovered to a frame form of data, thereby being outputted to the baseband processing unit 12.

The baseband processing unit 12 outputs internet information to the control unit 16, the display unit 14, and the storage unit 15 through the channel decoding process and a deinterleaving process.

That is, if a user-desired instruction is inputted through an external instruction input device such as a keypad or a touch screen, the instruction is transmitted to the gateway 40 for accessing the internet through the wireless network 30. The gateway 40 which receives the instruction uses a telephone number of the wireless terminal 10 and the like to generate a corresponding internet protocol address, searches information from the internet in response to the instruction, and transmits the information to the wireless terminal 10.

At this time, a document transmitted through the internet from the web server 60 to a client is written in the HTML.

Figure 4:
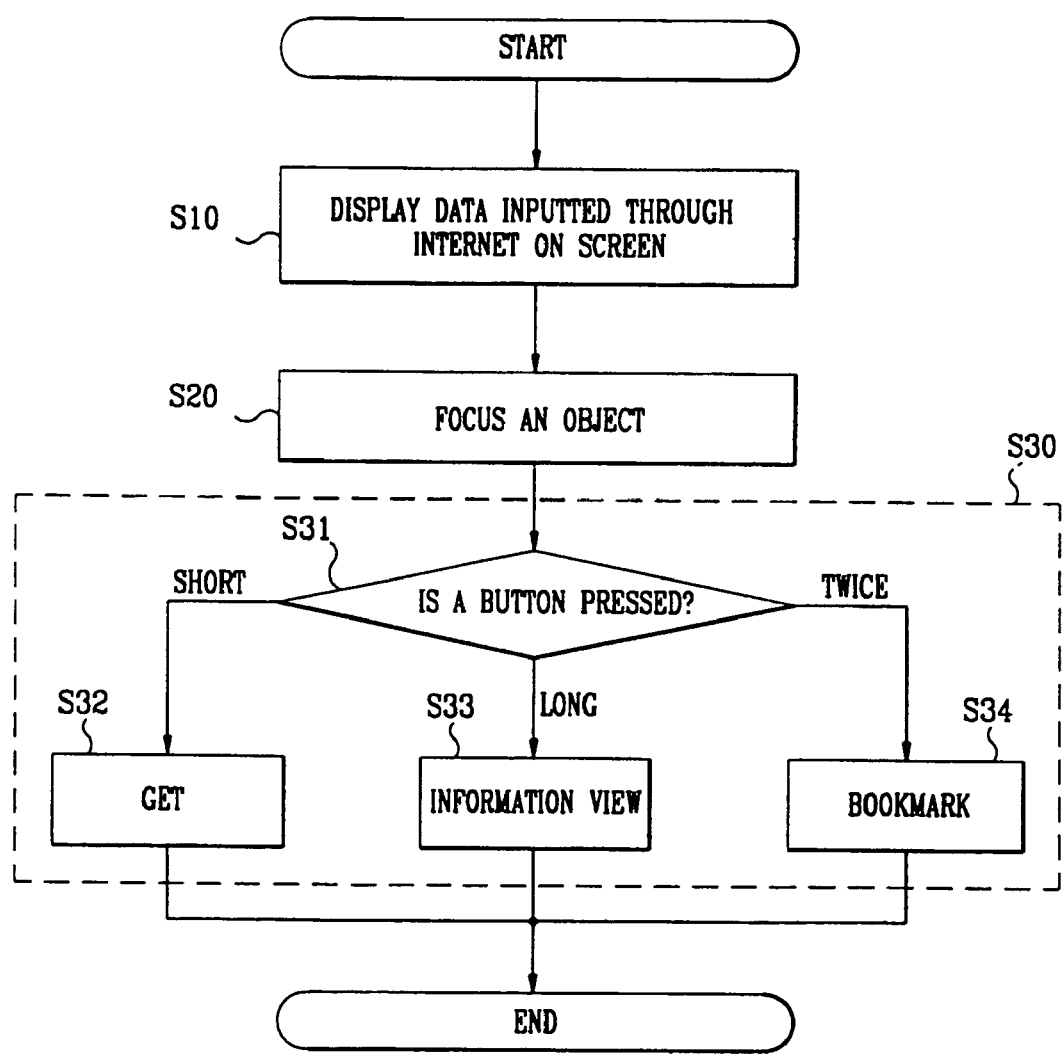
FIG. 4 is a flow chart for showing a method for executing an object in a wireless internet access terminal according to a first embodiment of the present invention.

FIG. 4 is a flow chart for showing a method for executing an object in a wireless internet access terminal according to a first embodiment of the present invention.

As shown in FIG. 4, the first embodiment includes steps of interpreting data inputted through the internet and displaying the interpreted data on a screen (S10); focusing any one of plural objects displayed on the screen and each linked to predetermined resource access location information (S20); and selecting and executing any one of various execution items of the focused object according to an input from a single button (S30).

Here, the execution items of an object are classified into operations of updating a screen while navigating according to the resource access location information (S32); updating a screen for indicating the resource access location information (S33); and storing the resource access location information in a temporary storage device to be immediately accessed in the necessity of a user (S34).

Further, the inputs from the single button are classified into a short time period input, a long time period input, and a twice consecutive input.

Operations and effects for the first embodiment of the present invention will be described with reference to FIG. 3 and FIG. 5.

FIG. 5 is a view for explaining respective steps shown in FIG. 4. As shown in FIG. 5, if a user presses a particular button for receiving an internet service, the control unit 16 changes a mode from a general phone call mode to an internet service mode, navigates web pages provided by internet service providers, and displays plural objects on a screen (S10).

Plural objects are displayed on the screen, each of the plural objects is linked to predetermined resource access location information (URL: Uniform Resource Locator).

Therefore, if a user focuses any one of the plural objects (S20), the control unit 16 selects and executes any one of various execution items of the focused object according to an input from the single button (S30).

For example, as shown in FIG. 5(A), if plural objects are displayed on a screen (S10), a user uses arrow buttons, and as shown in FIG. 5(B), focuses one object, for example "samsung electronics"(S20).

At this time, if a user presses a particular button to execute an execution item of the focused object of "samsung electronics", the control unit 16, as shown in FIG. 5(C), reverses a background color of the object of "samsung electronics" and executes the execution item according to an input from the button (S30). Further examples are shown in FIG. 5(D), FIG. 5(E), and FIG. 5(F) having different execution items.

Figure 1:
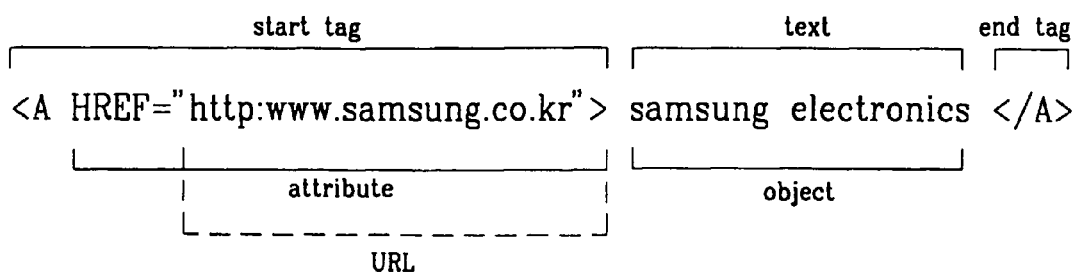
FIG. 1 is a view for showing one example of a general HTML code for making a hyperlinked text.

That is, if a document is inputted into a web browser, the control unit 16 analyzes HTML codes (same as in FIG. 1) having anchor tags in an HTML documents, updates a screen which navigating according to the resource access location information as shown in FIG. 5(D) if the button is pressed in a state of the short time period input (S32), updates the screen to indicate the resource access location information as shown in FIG. 5(E) if the button is pressed in a state of the long time period input (S33), and stores the resource access location information in the temporary storage unit 15 to be immediately accessed the resource access location information in the necessity of a user, as shown in FIG. 5(F), if the button is pressed in a state of the twice consecutive input (S34).

Figure 6:
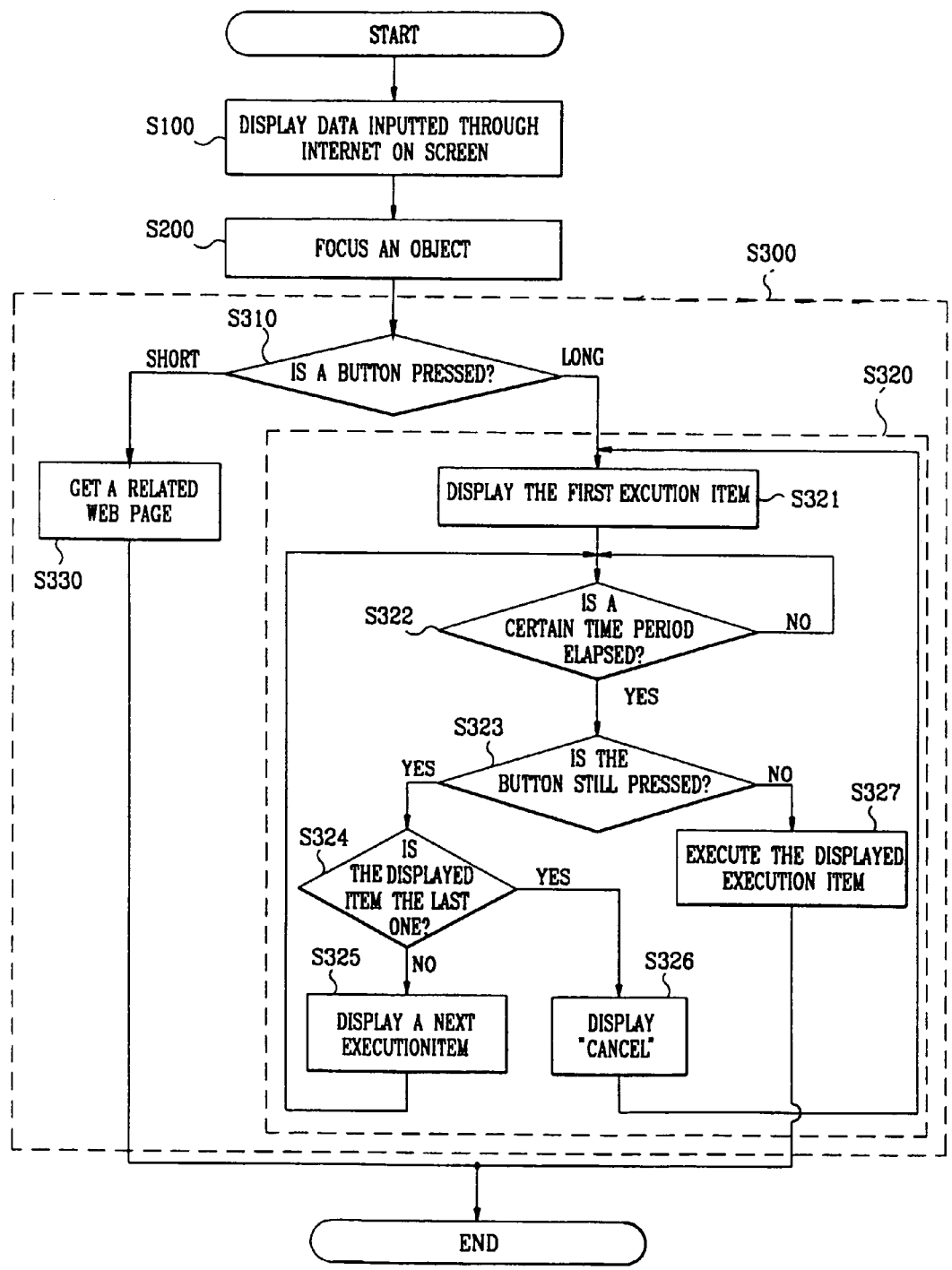
FIG. 6 is a flow chart for showing a method for executing an object in a wireless internet access terminal according to a second embodiment of the present invention.

FIG. 6 is a flow chart for showing a method for executing an object in a wireless internet access terminal according to a second embodiment of the present invention.

As shown in FIG. 6, the second embodiment of the present invention comprises steps of interpreting data inputted through the internet and displaying the inputted data on a screen (S100); focusing any one of plural objects displayed on the screen and each linked to predetermined resource access location (URL) information (S200); displaying plural execution items sequentially one by one by displaying one of plural execution items of the focused object on one screen and executing an execution item displayed on the present screen by another input from the button (S300).

Here, the step S300 has substeps for determining an input from the button (S310); updating a screen while navigating according to the resource access location information if the input from the button lasts for less than a certain time period (S320); and displaying plural execution items sequentially one by one on the screen by displaying one of the plural execution items of the focused object if the input from the button lasts for more than a certain time period and executing an execution item displayed on the present screen if the lasting input is stopped (S330).

Here, the substep S330 includes substeps of displaying a first item of a menu on the screen if the button input lasts for over a certain time period (S321); judging if the certain time period elapses (S322); judging if the input still lasts if the certain time period elapsed (S323); judging if the item displayed on the present screen is the last one if the input still lasts (S324); branching to the time period elapse judgement substep S322 after displaying a next item on the screen if the item is not the last one (S325); and branching to the first item display substep S321 after displaying a "cancel" item if the item is the last one (S326); and executing an execution item displayed on the present screen if the lasting input state is stopped (S327).

Further, the execution items of an object are classified into operations of updating a screen while navigating according to the resource access location information; updating a screen for displaying the resource access location information; and storing the resource access location information in a temporary storage unit to immediately access in the necessity of a user.

Furthermore, execution items such as "get", "information view", "bookmark", "cancel", and so on are sequentially stored in the flash memory 15, one execution item are read from the flash memeory 15 by an input of the button to be displayed on one screen, so that plural execution items are sequentially displayed on the screen one by one.

Operations and effects according to the second embodiment of the present invention are described with reference to FIG. 3 and FIG. 7.

FIG. 7 is a view for explaining respective steps shown in FIG. 6.

If a user presses a particular button for receiving an internet service, the control unit 16 changes modes from a general phone call mode to an internet service mode, and displays a document on a screen while navigating web pages provided by an internet service provider (S100).

Plural objects are displayed on the screen, each of the plural objects is linked to predetermined resource access location information.

Accordingly, if a user gives a focus on any one of the plural objects (S200), the control unit 16 displays plural execution items sequentially one by one on the screen by displaying one execution item of the plural execution items of the focused object on one screen, and executes an execution item displayed on the present screen by another input of the button (S300).

For example, if plural objects are displayed on a screen as shown in FIG. 7(A) (S100), a user uses arrow buttons and then gives a focus on one object, for example "samsung electronics", as shown in FIG. 7(B)(S200).

If a user presses an execution button to execute an execution item of the focused object "samsung electronics", the control unit 16 reverses a background color of the object "samsung electronics", as shown in FIG. 7(C), and then executes the execution item. Different execution items are executed, as shown in FIGS. 7(D), 7(E), 7(F), 7(G), 7(H), and 7(I), according to inputs from the button.

That is, if an HTML document is downloaded into a web browser, the control unit 16 analyzes HTML codes (same as in FIG. 1) having anchor tags in the HTML document, updates a screen while navigating according to the resource access location information, as shown in FIG. 7(D), if the button is pressed for less than a certain time period (S330), and dispalying the plural execution items sequentially one by one on the screen by displaying one of the plural execution items of the focused object on one screen if the button is pressed for a certain time period and then executes an execution item on the present screen if the button, which is pressed for a certain time period, is released (S330).

That is, if a button is pressed for a certain time period, the control unit 16 reads the first item "get" stored in the flash memory 15 to be displayed on the screen as shown in FIG. 7(E)(S321), judges if a certain time period elapses (S322), and then judges if the button is still pressed if the certain time period elapsed (S323).

At this time, if the button is released, the control unit 16 executes an execution item of "get" displayed on the present screen (S327). That is, the control unit 16 analyzes HTML codes and updates a screen while navigating, as shown in FIG. 7(D), according to the resource access location information (S327).

In the meantime, if the button is still pressed, the control unit 16 judges if the execution item "get" displayed on the present screen is the last one (S324), and if not the last one, reads a next execution item "information view" stored in the flash memory 15 to be displayed on the screen as shown in FIG. 7(F)(S325), and judges if a certain time period elapses (S322), and the judges if the button is still pressed in case that the certain time period elapsed (S323).

At this time, if the button is released, that is if an input from the button is stopped, the control unit 16 executes an execution item "information view" displayed on the present screen (S327). That is, the control unit 16 analyzes HTML codes and updates a screen to display the resource access location information as shown in FIG. 7(I)(S327).

In the meantime, if the input from the button lasts, that is, if the button is still pressed, the control unit 16 judges if the execution item "information view" displayed on the present screen is the last one (S324), if not the last one, reads a next execution item "bookmark" stored in the flash memory 15 to be displayed on the screen as shown in FIG. 7(G)(S324), and judges if a certain time period elapses (S322), and then judges if the input from the button lasts again in case that the certain time period elapsed (S323).

At this time, if the input from the button is stopped, the control unit 16 executes the execution item "bookmark" displayed on the present screen (S327). That is, the control unit 16 analyzes HTML codes and stores the resource access location information in the temporary storage unit 15 to be immediately accessed in the necessity of a user (S327).

In the meantime, if the input from the button still lasts, the control unit 16 judges if the execution item "bookmark" displayed on the present screen is the last one (S324), and, if the last one, reads a next execution item "cancel" stored in the flash memory 15 to be displayed on the screen as shown in FIG. 7(H)(S326), and then reads again the first execution item "get" stored in the flash memory 15 to be displayed on the screen (S321).

At this time, one execution item is displayed on one screen by using the flash memory, and the execution item displayed on the screen may be all forms of a text and an image.

Further, as executing an execution item of an object by using a button on a wireless internet access terminal, a mouse is used in a computer and a pen is used for a touch screen, to thereby execute an execution item of an object.

That is, all kinds of browser applications such as CDMA phones, web video phones, PCS phones, and so on for a terminal having a keypad-type, a button-type, or a pen-type input device may be employed.

As described above, the present invention has an effect in that a user uses internet services conveniently through a wireless terminal since a user determines an execution item of an object with ease without pressing buttons several times with inconvenience by providing different execution items of an object according to input states of a single button in case that there exist plural execution items of one object.

Further, as described above, the present invention has another effect in that a user uses internet services conveniently through a wireless terminal since a user determines an execution item of an object with ease without pressing buttons several times with inconvenience by executing an execution item, which is selected by a user, displayed on the present screen with displaying execution items sequentially one by one in case that there exist plural execution items with respect to one object.

DEPOSIT OF COMPUTER PROGRAM LISTINGS

Not Applicable

What is claimed is:

1. A method for executing an object in a wireless internet access terminal, comprising steps of:
   interpreting data inputted through the internet and displaying the inputted data on a screen of the wireless internet access terminal, said data including plural objects that are each linked to predetermined resource location information;
   focusing any one of the objects displayed on the screen; and
   selecting and executing any one of various execution items of the focused object according to an input state of a single button,
   wherein the input states of the single button include a short time period input, a long time period input, and a twice consecutive input.

2. The method as claimed in claim 1, wherein the execution items of an object include operations of updating a screen while navigating according to the resource access location information; updating a screen for displaying the resource access location information; and storing the resource access location information in a temporary storage unit to be immediately accessed in the necessity of a user.

3. The method as claimed in claim 1, wherein each object is defined by at least one HTML tag.

4. The method as claimed in claim 3, wherein the resource access location information linked to a corresponding object is an attribute of the at least one HTML tag defining the corresponding object.

5. A method for executing an object in a wireless internet access terminal, comprising steps of:
   interpreting data inputted through the internet and displaying the inputted data on a screen of the wireless internet access terminal, said data including plural objects that are each linked to predetermined resource access location (URL) information;

focusing any one of the objects displayed on the screen; and displaying plural execution items sequentially one by one by displaying one of the plural execution items of the focused object on one screen and executing an execution item displayed on the present screen by inputs from a button.

6. The method as claimed in claim 5, wherein the inputs from the button include an input lasting for more than a certain time period and a stop of the input.

7. The method as claimed in claim 6, wherein the plural execution items are sequentially displayed one by one on the screen by displaying one of the plural execution items of the focused object if the input from the button lasts for more than a certain time period, and an execution item displayed on the present screen is executed if the input is stopped.

8. The method as claimed in claim 7, further comprising steps of:

displaying a first item of a menu on the screen if the input last for more than a certain time period;

judging if the certain time period elapses;

judging if the input still lasts in case that the certain time period elapsed;

judging if the item displayed on the present screen is the last one in case that the input still lasts;

branching to the time period elapse judgement step after displaying a next item on the screen if the item is not the last one;

branching to the first item display step after displaying a "cancel" item if the item is the last one; and executing an execution item displayed on the present screen if the lasting input is stopped.

9. The method as claimed in claim 5, wherein the execution items of an object include operations of updating a screen while navigating according to the resource access location information; updating a screen for displaying the resource access location information; and storing the resource access location information in a temporary storage unit to be immediately accessed in the necessity of a user.

10. The method as claimed in claim 5, wherein a screen is updated while navigating according to the resource access location information if the input from the button lasts for less than a certain time period.

11. The method as claimed in claim 5, wherein execution items including "get", "information view", "bookmark", and "cancel" are sequentially stored in a storage unit, and one execution item is read from the storage unit by an input from the button to be displayed on one screen, so that plural execution items are sequentially displayed on the screen one by one.

12. The method as claimed in claim 11, wherein the storage unit is a flash memory.

13. The method as claimed in claim 5, wherein each object is defined by at least one HTML tag.

* * * * *